United States Patent

[11] 3,622,975

[72] Inventor Lawrence J. Vanderberg
  Ann Arbor, Mich.
[21] Appl. No. 48,216
[22] Filed June 22, 1970
[45] Patented Nov. 23, 1971
[73] Assignee Ford Motor Company
  Dearborn, Mich.

[54] ENGINE TEMPERATURE-INDICATING APPARATUS
2 Claims, 2 Drawing Figs.
[52] U.S. Cl. .................................... 340/57, 340/227
[51] Int. Cl. .................................... G08b 21/00
[50] Field of Search ............................ 340/52 F, 57, 227, 228

[56] References Cited
UNITED STATES PATENTS
3,431,779 3/1969 Wilken et al. ................ 340/52 X
1,862,994 6/1932 Zubaty et al. ................ 340/57 X
3,302,171 1/1967 Sensing ...................... 340/57

Primary Examiner—Alvin H. Waring
Attorneys—John R. Faulkner and Robert W. Brown

ABSTRACT: Apparatus for indicating motor vehicle engine or engine coolant temperature is described. The apparatus includes a gauge having movable means for indicating engine temperature, the gauge being operated by an electrical current from a source of electrical power and the indicator position being determined by the amount of current through the gauge. Resistance elements are connected in electrical circuit with the gauge and temperature-responsive switches associated with the engine are provided for selectively connecting and disconnecting the resistances in the gauge circuit. The connection or disconnection of the resistances produce discrete movements of the indicating means.

PATENTED NOV 23 1971 3,622,975

INVENTOR
LAWRENCE J. VANDERBERG
BY John R. Faulkner
Robert W. Brown
ATTORNEYS

ENGINE TEMPERATURE-INDICATING APPARATUS

BACKGROUND OF THE INVENTION

This invention relates to temperature-indicating apparatus for a motor vehicle to provide the operator thereof with a visual indication of engine or engine coolant operating temperature. More particularly, it relates to a temperature-indicating system wherein the vehicle operator is provided with an indication of engine temperature by observation of an electrically responsive gauge having indicating means, such as a pointer, movable across the face thereof.

Gauges of the kind described above have long been used to provide a visual indication of motor vehicle engine temperature, and various devices attached to and associated with the vehicle engine have been used to transmit an electrical signal to a temperature gauge located at a remote distance from the engine. In recent times, motor vehicle manufacturers have utilized a thermistor, a resistance element having a negative temperature coefficient, in series with the temperature-indicating gauge. The resistance of the thermistor decreases as its temperature increases to cause an increase in the current through the temperature-indicating gauge. The increased current through the gauge results in movement of its indicating pointer to display a change in temperature.

Most internal combustion engines in use at present have a normal operating temperature, desirable from the standpoint of engine efficiency, that is very close to a temperature which is considered excessive for lengthy or continuous engine operation. The narrow range between normal engine operating temperature and excessive temperature has created some difficulties with regard to the visual display of an excessive engine-operating temperature on a gauge. These difficulties are due in part to the limited operational characteristics of available thermistors and to the desire to display low engine temperatures as well as high engine temperatures. As a result, the reading on the temperature gauge for normal engine operation has been very close to the full-scale reading for excessive engine operating temperature conditions.

Another system that is commonly used for temperature measurement utilizes a temperature switch associated with the engine and a lamp remotely located from the engine for the indication of an excessive temperature condition. In addition, this system frequently incorporates a second temperature switch and a second lamp to indicate a cold temperature condition of the motor vehicle engine. The difficulty with this system is that the lamps must be provided with checking means to show the operator of the vehicle that the lamps are in operable condition. This, of course, increases the cost of the temperature measurement system.

SUMMARY OF THE INVENTION

The present invention overcomes the aforementioned disadvantages of prior temperature-measuring systems for motor vehicles by providing the vehicle operator with a gauge indication of engine-operating temperature wherein excessive engine-operating temperature conditions are widely separated on the gauge face from the indications for normal and low operating temperature conditions. This wide scale separation between normal and excessive temperature indication, and, if desired, between low and normal temperature conditions, is accomplished by the introduction of one or more electrical resistance elements in series or parallel with the temperature-indicating gauge. Thermal switches, associated with the engine and responsive at predetermined temperature values to the engine or engine coolant operating temperatures, are utilized to connect and to disconnect, selectively, the electrical resistances connected in series or parallel with the gauge. The selective connection or disconnection of an electrical resistance produces a sudden movement of the temperature gauge indicating means with respect to the gauge face. Thus, a temperature-responsive switch is used to add or remove a discrete, or lump, amount of electrical resistance in series or parallel with the gauge. This changes, by a discrete amount, the resistance which controls the current in the gauge, thereby to change that current by a discrete amount. Because the gauge is responsive to the amount of electrical current flowing therethrough, the indicating means thereof also moves in discrete amounts in accordance with the selective addition or removal of the electrical resistances. Such discrete movements of the gauge indicating means, if sufficiently large, may be readily observed by the motor vehicle operator.

If desired, a relay buzzer may be incorporated into the temperature-indicating circuitry to provide the motor vehicle operator with an audible signal in addition to the visual display described above. Moreover, a variable resistance element, such as a thermistor, may be incorporated into the circuit to provide a continuously variable indication of engine temperature changes.

DESCRIPTION OF THE PREFERRED EMBODIMENTS

Figure 1:
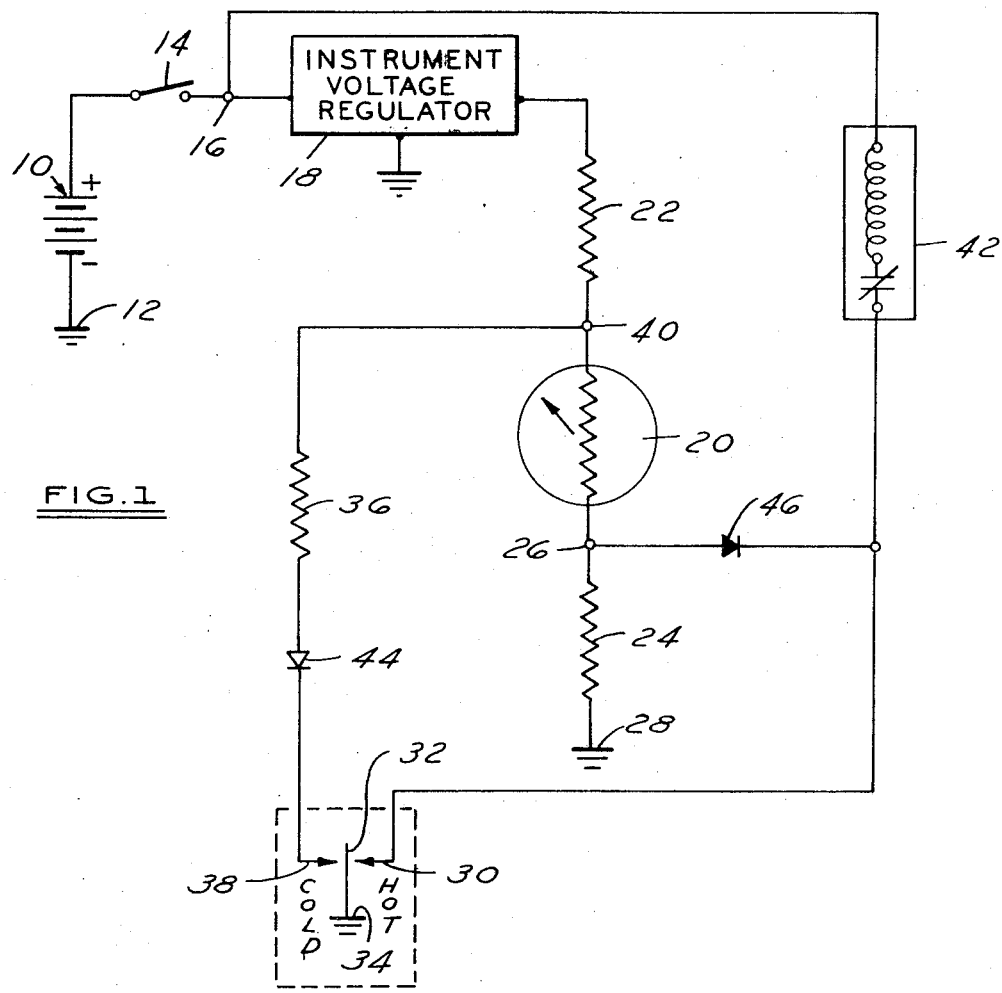
FIG. 1 is a schematic diagram of one embodiment of the temperature-indicating apparatus.

With particular reference to FIG. 1, there is shown an electrical schematic diagram which illustrates one embodiment of the invention for use in many automotive applications. The circuit comprises a source of electrical power 10, such as a storage battery, having its negative terminal connected to ground at 12 and its positive terminal connected to one pole of a switch 14. The other pole of switch 14, which may be a conventional automotive ignition switch, is connected at a terminal 16 with an instrument voltage regulator 18.

The instrument voltage regulator 18 is shown in block diagram form in FIG. 1 and performs the function of regulating the voltage from the source of electrical power. It may be of the type hereinafter described in connection with the circuit shown in FIG. 2, or it may be of a different type. Moreover, its use in the circuit of FIG. 1 is not essential, but it adds to the accuracy of the temperature-indicating apparatus.

Gauge 20 is provided to indicate engine or engine coolant temperature. The gauge preferably is placed in a location, such as the dash panel, where it may be observed readily by the motor vehicle operator. The gauge includes a gauge face and an indicator movable across the gauge face. The gauge is electrical in nature, and the movement of the indicator with respect to the gauge face is proportional to the magnitude of the current in the gauge. Preferably, the gauge is a milliammeter of the type having a coil of resistance wire surrounding a bimetallic strip which is deflected in accordance with the amount of current in the wire coil. Deflection of the bimetallic strip produces movement of the indicator with respect to the gauge face. Gauge 20 is connected, through a resistor 22, the instrument voltage regulator 18, and switch 14, to the source of electrical power 10. A first electrical resistance 24 is connected in series with the gauge 20 at terminal 26 and is connected to ground at 28.

Connected in parallel with the first electrical resistance 24 is a first temperature-responsive switch 30. First temperature-responsive switch 30 may be a separate thermal switch or it may comprise a portion of a multiple thermal switch, as is shown schematically in Figure 1. Switch 30 is associated with the motor vehicle engine and is placed in such location as to enable it to respond to the temperature of the engine or engine coolant. In the embodiment shown in Figure 1, first switch 30 has a blade 32 connected to ground at 34 and is maintained in a electrically open condition at temperatures below a predetermined value and is maintained in an electrically closed condition at temperatures above the predetermined value.

A second electrical resistance 36 is connected in series with a second switch 38. This series-connected second electrical resistance and second switch is connected, at terminal 40 and ground 34, in parallel with gauge 20 and the parallel combination of first electrical resistance 24 and first switch 30. Second switch 38 is a temperature-responsive thermal switch associated with the motor vehicle engine and is maintained in an electrically closed condition at temperatures below a predetermined value and is maintained in an electrically open condition at temperatures above the predetermined value.

A relay buzzer 42 may be connected as shown in Figure 1 to provide an audible signal upon closure of switch 30. Diodes 44 and 46 are provided to protect the various circuit elements from spurious voltage peaks which might arise during switching. Also, diode 46 prevents operation of relay buzzer 42 except when switch 30 is in its electrically closed condition.

The predetermined temperature at which second switch 38 changes from its closed condition to its open condition is lower than the predetermined temperature at which first switch 30 changes from its open condition to its closed condition. Thus, when the motor vehicle engine temperature is low, switch blade 32 will have moved toward the left (cold) as viewed in Figure 1 to maintain second switch 38 in an electrically closed condition. When switch 14 is closed, current will flow from the source of electrical power 10 through the instrument voltage regulator 18, through resistor 22, and to terminal 40. At terminal 40, the current divides, a portion of it flowing through gauge 20 and first electrical resistance 24 to ground 28, and another portion flowing from terminal 40 through second electrical resistance 36, diode 44 and switch 38 to ground at 34. Because the current is divided in this manner, the reading of gauge 20 will be at the lower portion of its scale. Upon operation of the motor vehicle engine, its temperature increases. As the engine temperature continues to increase, a point is reached at which second switch 38 achieves its temperature-responsive predetermined value and changes from an electrically closed condition to an electrically open condition. Switch 30 is also in an electrically open condition at this time, as is illustrated in Figure 1.

At the instant that switch 38 attains an open condition, second electrical resistance 36, in effect, becomes infinite and current no longer divides at terminal 40, but rather all of the current flows through resistor 22, gauge 20 and first electrical resistance 24 to ground at 28. Moreover, the magnitude of the current through gauge 20 is increased by a fixed amount because the current is no longer divided and because the resistance of the circuit containing gauge 20 is changed by a discrete, or lump, amount. This produces a pronounced change in the position of the gauge indicator with respect to the gauge face.

If the engine or engine coolant temperature increases to a point where switch 30 reaches its predetermined temperature-responsive value, switch blade 32 moves to the right (hot) as viewed in FIG. 1 to place switch 30 in its electrically closed condition. The effect of this is to short circuit first electrical resistance 24, thereby to decrease by a discrete amount the electrical resistance of the circuit in which gauge 20 is contained. This, again, increases the current through gauge 20 and causes a definite change in the position of the indicator with respect to the gauge face.

Thus, the motor vehicle operator is provided with two pronounced visual gauge displays of engine temperature changes. One of these occurs as the engine temperature increases from a cold condition to a normal operating condition, and the other occurs as it increases from a normal operating condition to an undesirably hot condition.

An additional warning to the vehicle operator may be provided by relay buzzer 42, which produces an audible signal upon closure of switch 30 to indicate a hot condition. Relay buzzer 42 is of conventional design and comprises a coil having a normally closed contact which is opened when current flows through the coil. The opening of the normally closed contact disrupts the coil current causing the contact to return to its closed condition and again establishing coil current. This again energizes the coil and causes the contact to open. The cyclical opening and closing of the contact produces the audible signal.

In the circuit shown in FIG. 1, the resistance affecting the current through gauge 20 is changed by discrete amounts to vary the current therethrough to produce a definite change in gauge indicator position. As described, two pronounced changes occur, the first when switch 38 moves from a closed condition to an open condition and the second when switch 30 moves from an open condition to a closed condition. If desired, additional pronounced and definite changes in the gauge indicator position may be obtained in incorporating into the circuit additional parallel or series resistances which may be selectively added and removed to cause changes in the overall resistance affecting gauge 20.

Figure 2:
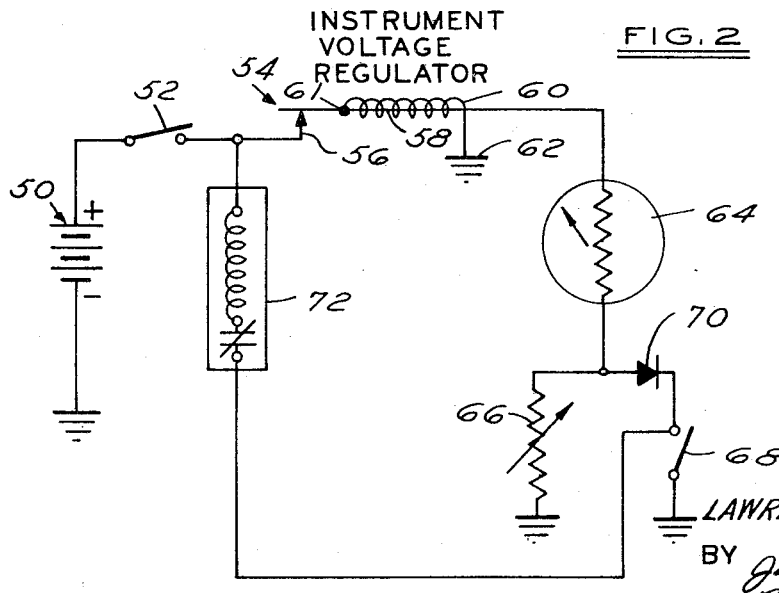
FIG. 2 is a schematic diagram of another embodiment of the invention.

With particular reference now to FIG. 2, there is shown a schematic diagram of another embodiment of the invention. The circuit comprises a source of electrical power 50 having connected in series therewith a switch 52, such as an ignition switch. Connected to the ignition switch 52 is an instrument voltage regulator, shown generally at 54, including a switch contact 56 and a bimetallic strip 58 surrounded by a coil 60 electrically connected to the bimetallic strip at 61 and to ground at 62. This is the preferred type of instrument voltage regulator and its operation is well understood in the art.

The voltage output from the regulator 54 is fed to a gauge 64 of the kind previously described. Connected in series with gauge 64 is a parallel circuit comprising a variable electrical resistance 66 and a temperature-responsive switch 68. Diode 70 and relay buzzer 72 are connected in a manner similar to that previously described in connection with the circuit of FIG. 1. Preferably, variable resistance 66 is a thermistor having a negative temperature coefficient.

When ignition switch 52 is closed, current flows through the instrument voltage regulator and through gauge 64 and variable resistor 66 to ground. If the motor vehicle engine temperature is cold or at a normal level, then temperature-responsive switch 68 is in an open condition. As the engine temperature increases, the resistance of variable resistor 66 decreases (because of its negative temperature coefficient), and this causes the current through gauge 64 to increase causing a continual change in the position of the gauge indicator with respect to the gauge face as the engine temperature continues to increase. If the engine becomes excessively hot, this condition is detected by temperature-responsive switch 68, which then closes. When this occurs, variable resistance 66 is short-circuited. The resistance in series with gauge 64 is reduced by a discrete amount and current therethrough increases to cause a pronounced change in the position of the indicator. In addition, the closure of switch 68 energizes relay buzzer 72 to provide the motor vehicle operator with an audible signal, as well as the visual display on gauge 64.

If desired, the circuit illustrated in FIG. 1 may also include a variable resistance element to provide a gauge display that varies continuously with changes in engine or engine coolant temperature, as well as a visual display which changes by pronounced and discrete amounts at predetermined temperatures as described above. This could be accomplished by the replacement of fixed electrical resistance 24 with a variable resistance.

Based upon the foregoing description, what is claimed and desired to be protected by Letters Patent is:

1. Temperature-indicating apparatus for a motor vehicle to provide the operator thereof with a visual indication of engine or engine coolant operating temperature, which comprises: a source of electrical power; gauge means for temperature indication connected to said source of electrical power and having movable indicating means, the position of said indicating means being determined by the magnitude of electrical current in said gauge means; a first electrical resistance connected in series with said gauge means; first switch means in association with the motor vehicle engine and connected in series with said gauge means and in parallel with said first electrical resistance, said first switch means being in an electrically open condition at temperatures below a predetermined value and in an electrically closed condition at temperatures above the predetermined value; a second electrical resistance; and second temperature-responsive switch means associated with the motor vehicle engine and connected in series with said second electrical resistance, said second switch means being in an electrically closed condition at temperatures below a predetermined value and being in an electrically open condition at temperatures above the predetermined value, and said second switch means together being connected in parallel with said gauge means and said parallel-connected first electrical resistance and first switch means.

2. Temperature-indicating apparatus in accordance with claim 1, which further includes a relay buzzer electrically connected to said first switch means and operative when said first switch means is in its electrically closed condition to provide an audible signal.

* * * * *